United States Patent
Ehara

(10) Patent No.: US 7,603,405 B2
(45) Date of Patent: *Oct. 13, 2009

(54) INFORMATION PROCESSING SYSTEM, INFORMATION PROCESSING METHOD, AND STORAGE MEDIUM THEREFOR

(75) Inventor: Tadashi Ehara, Kanagawa (JP)

(73) Assignee: Sony Corporation, Tokyo (JP)

( * ) Notice: Subject to any disclaimer, the term of this patent is extended or adjusted under 35 U.S.C. 154(b) by 392 days.

This patent is subject to a terminal disclaimer.

(21) Appl. No.: 11/437,053

(22) Filed: May 19, 2006

(65) Prior Publication Data

US 2006/0212565 A1    Sep. 21, 2006

Related U.S. Application Data

(63) Continuation of application No. 09/907,067, filed on Jul. 17, 2001, now Pat. No. 7,519,651.

(30) Foreign Application Priority Data

Jul. 19, 2000  (JP) .............................. 2000-218920

(51) Int. Cl.
   *G06F 15/16*  (2006.01)
(52) U.S. Cl. ........................ 709/201; 709/203; 709/217; 709/219; 709/227
(58) Field of Classification Search ................ 709/201, 709/203, 217, 219, 227
See application file for complete search history.

(56) References Cited

U.S. PATENT DOCUMENTS

| | | | |
|---|---|---|---|
| 5,819,112 A * | 10/1998 | Kusters ...................... 710/36 |
| 6,151,652 A | 11/2000 | Kondo et al. |
| 6,301,607 B2 | 10/2001 | Barraclough et al. |
| 6,332,146 B1 | 12/2001 | Jebens et al. |
| 6,337,712 B1 * | 1/2002 | Shiota et al. ............. 348/231.1 |
| 6,463,467 B1 | 10/2002 | Mages et al. |
| 6,571,271 B1 * | 5/2003 | Savitzky et al. ............. 709/200 |
| 6,670,933 B1 | 12/2003 | Yamazaki |

FOREIGN PATENT DOCUMENTS

| | | |
|---|---|---|
| JP | 10-150523 | 6/1998 |
| JP | 11-73247 | 3/1999 |
| JP | 11-164282 | 6/1999 |

\* cited by examiner

*Primary Examiner*—Andy Ho
(74) *Attorney, Agent, or Firm*—Frommer Lawrence & Haug LLP; William S. Frommer; Thomas F. Presson

(57) ABSTRACT

In an information processing system, when image data captured by a digital camera is to be stored on a remote HTTP server, a user stores the image data on a removable medium, for example, a memory card, and inserts it into a media drive of a local personal computer. In response thereto, the image data on the memory card is automatically read by the personal computer and is then transmitted to the HTTP server via a network.

3 Claims, 4 Drawing Sheets

INFORMATION PROCESSING SYSTEM, INFORMATION PROCESSING METHOD, AND STORAGE MEDIUM THEREFOR

This is a continuation of application Ser. No. 09/907,067, filed Jul. 17, 2001, now U.S. Pat. No. 7,519,651, which claims priority to Japanese Patent application number 2000-218920, filed Jul. 19, 2000, the entirety of which is incorporated herein by reference.

BACKGROUND OF THE INVENTION

1. Field of the Invention

The present invention relates to information processing systems and information processing methods for processing a variety of computerized data and contents. In particular, the present invention relates to information processing systems and information processing methods which allow computerized data and contents to be exchanged with other systems via a removable medium, and to be transferred to other systems via a network.

More specifically, the present invention is directed to an information processing system and information processing method which allows efficient distribution of computerized data and contents using a removable medium and a network.

2. Description of the Related Art

With the recent technological innovations, general-purpose computer systems, which are relatively small and inexpensive while providing high value added and advanced capabilities, called workstations (WS) and personal computers (PC), are developed and distributed, and are now common in universities or laboratories, companies or offices, and daily life in the general household.

On a computer system, any type of contents, including still picture, motion picture, and sound, as well as program codes and text, is computerized or digitized and processed in a predetermined file format. Computer files may be fixedly stored on the system using a storage device such as a hard disc, or may be stored on a removable medium such as an FD (Floppy Disc), a CD (Compact Disc), a DVD (Digital Versatile Disc), and a memory stick, which is exchangeable and detachable from the system. In the latter case, the computer files can be transferred between a plurality of systems using the removable medium.

Furthermore, recently, expectations have been raised for network computing techniques which allow interconnection of computers. The network computing allows users of different computers to share computer resources and to share, distribute, provide, and exchange information smoothly on the network. It also allows the users to collaborate on the computers interconnected via the network.

The network for interconnecting the computers may take various forms, for example, LAN (Local Area Network) such as Ethernet and Bluetooth, WAN (Wide Area Network) which interconnects different LANs via a leased line, etc., and the Internet which has evolved to a literally global network as a result of more and more networks being interconnected.

The Internet has evolved into the huge network as it is today, serving literally as the network of networks, as a result of continued voluntary efforts to interconnect servers (typically UNIX workstations) provided at universities and laboratories. An enormous number of servers are now connected to the Internet, making various information resources available to an enormous number of clients. The servers on the Internet are connected with each other typically based on TCP/IP (Transmission Control Protocol/Internet Protocol).

On the Internet, various services are available, including WWW (World Wide Web), news, TELNET (TELetypewriter NETwork), FTP (File Transfer Protocol), and Gopher.

WWW is a wide area information retrieval system which provides a hyperlinked information space, and it is the primary contributing factor to the explosive growth and rapid spread of the Internet. WWW allows browsing of various types of contents such as text, image, and sound in a hypertext format. Hypertext information on WWW is described in a hypertext description language called HTML (Hypertext Markup Language). Currently, an enormous amount of various information resources is available on the Internet in the form of HTML documents, some for free and others not for free. The information resources such as the HTML documents are identified on the basis of an identifier called URL (Uniform Resource Locator), and can be transferred in accordance with HTTP (Hypertext Transfer Protocol), as is known.

Information such as still picture, text, etc. obtained by or stored on a computer system can be distributed, stored, viewed, and edited via a network.

For example, contents which has been supplied to a computer of a user via a removable medium can be uploaded on a predetermined sever via a network so that the contents can be made public, provided, or distributed to other computers on the network.

In order to transmit contents stored on the removable medium to other systems via the network, the user is required to load the removable medium on a predetermined media drive and execute the transmission of the contents. However, in order to execute the transmission, the user is required to explicitly operate software, etc.

For example, in order to make still picture data captured by the digital camera available on a predetermined HTTP server on the Internet, first, the removable medium, for example, a memory card or a memory stick, is loaded on a media drive of the personal computer. Then, the user needs to operate a software tool which allows access to the removable medium, thereby copying the still picture data onto a disc on the server. Thus, the user is required to have considerable knowledge regarding personal computers and software tools.

As another technique, a type of computer system is known in which a program stored on a CD-ROM loaded on a CD-ROM drive is automatically activated. However, the functionality is operative only within a standalone computer, not allowing transmission of information to other systems connected via the network.

SUMMARY OF THE INVENTION

The present invention has been made in view of the technical shortcomings as above, and it is an object of the present invention to provide an information processing system and information processing method which are suitable for processing a variety of computerized data and contents.

It is another object of the present invention to provide an information processing system and information processing method which computerized data and contents to be exchanged with other systems via a removable medium, or transferred to other systems via a network.

It is still another object of the present invention to provide an information processing system and information processing method which allows efficient distribution of computerized data and contents using a removable medium and a network.

It is yet another object of the present invention to provide an information processing system and an information processing method which automatically makes information stored on a removable medium available on other information processing apparatuses connected via a network.

To these ends, the present invention, in a first aspect thereof, provides an information processing system for distributing information provided via a removable medium. The information processing system includes a media access unit for receiving the removable medium and accessing information stored thereon; a loading detection unit for detecting the removable medium loaded on the media access unit; a communications unit for connecting the information processing system to an external network; and a central processing unit for controlling the overall operation of the information processing system. In the information processing system, the central processing unit accesses the removable medium in response to the detection of the removable medium loaded on the media access unit, and transmits information read therefrom to a host system on the external network.

The host system may be, for example, an HTTP server which distributes information resources in accordance with HTTP (Hypertext Transfer Protocol). The information resources provided by the HTTP server is located on a TCP/IP network using a resource locator called URL. Client machines on the TCP/IP network is allowed to browse various information resources by using an HTTP browser.

The location of the host system, to which the information read from the removable medium is to be transmitted, may be designated in the information, or may be predetermined within the information processing system.

The information stored on the removable medium may include image data captured by a digital camera. The image data is provided as a computer file in a predetermined format, for example, JPEG (Joint Photographic Experts Group), GIF (Graphics Interchange Format), PNG (Portable Network Graphics), etc.

The removable medium may be, for example, an FD (Floppy Disc), a CD (Compact Disc), a DVD (Digital Versatile Disc), or a memory stick. Alternatively, a connector, for example, an IEEE 1394 port or a USB (Universal Serial Bus) port, which allows connection to an external device, such as a digital camera, which supplies information, may be used.

The present invention, in a second aspect thereof, provides an information processing method for distributing information provided via a removable medium. The information processing method includes the steps of detecting the insertion of the removable medium; accessing the removable medium and automatically reading information therefrom in response to the detection of the insertion of the removable medium; and transmitting the information read from the removable medium to a host system via a network.

The present invention, in a third aspect thereof, provides a storage medium storing computer software in a computer-readable format for executing information processing on a computer system, whereby information provided via a removable medium is distributed. The computer software includes the steps of detecting the insertion of the removable medium; accessing the removable medium and automatically reading information therefrom in response to the detection of the insertion of the removable medium; and transmitting the information read from the removable medium to a host system via a network.

The storage medium provides computer software in a computer-readable format to, for example, a general-purpose computer system which is capable of executing various program codes. The storage medium is detachable and portable, and is, for example, a CD (Compact Disc), an FD (Floppy Disc), or an MO (Magneto-Optical Disc). It is also technically feasible to provide the computer software in a computer-readable format to a particular computer system via a transmission medium such as a network (either by wireless or via a cable).

The storage medium defines the structural or functional association between the computer software and the computer system for achieving predetermined functionality of the computer software on the computer system. That is, by installing the computer software onto the computer system via the storage medium, the computer system operates in association with the computer software, achieving the same operations as in the information processing system and information processing method according to the first and second aspect of the present invention.

The information processing system and information processing method according to the present invention are suitable for processing a variety of computerized data and contents.

Furthermore, the information processing system and information processing method according to the present invention allow computerized data and contents to be exchanged with other systems via a removable medium, or transferred to other systems via a network.

Furthermore, the information processing system and information processing method according to the present invention allow efficient distribution of computerized data and contents using a removable medium and a network.

Furthermore, the information processing system and information processing method according to the present invention allows automatically making information stored on a removable medium available on other information processing systems connected via a network.

According to the present invention, by using a removable medium, a media reading apparatus which is capable of detecting the presence of the removable medium, an information processing system in which the media reading apparatus is included, and an external information processing system (e.g. an information distribution server such as an HTTP server) connected to the information processing system via a network, information stored on the removable medium can be automatically read and transmitted to the external information processing system via the network.

For example, when image data captured by a digital camera is to be transmitted to a remote HTTP server, a user only has to load a removable medium such as a memory card on which desired image data is stored onto a local personal computer. In response to the loading of the removable medium, the personal computer accesses the removable medium and automatically reads the image data therefrom, and then transmits the image data to the HTTP server via a network. Thus, the user is allowed to store the image data on the HTTP server without much technical knowledge, and the image data can be distributed or viewed via the HTTP server. Furthermore, the user is freed from complex operations when uploading the image data onto the HTTP server.

Other objects, features, and advantages of the present invention will be made apparent from the following detailed description of an embodiment of the present invention taken in conjunction with the accompanying drawings.

DESCRIPTION OF THE PREFERRED EMBODIMENT

A preferred embodiment of the present invention will be described below with reference to the accompanying drawings.

Figure 1:
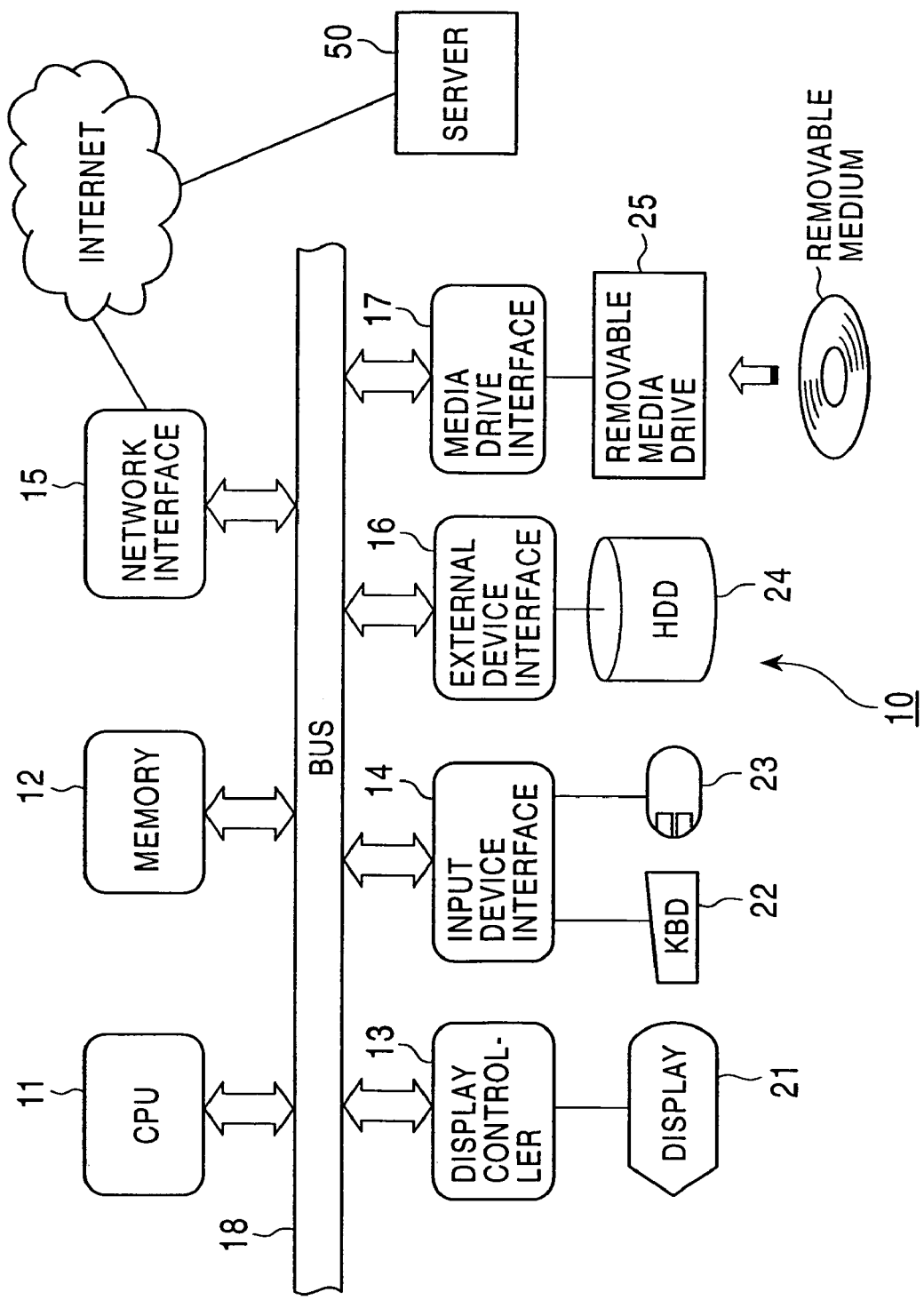
FIG. 1 is a schematic diagram showing the hardware configuration of an information processing system according to an embodiment of the present invention.

FIG. 1 is a schematic diagram showing the hardware configuration of an information processing system 10 according to an embodiment of the present invention. The information processing apparatus 10 may be, for example, a PC/AT compatible machine from IBM Corporation, or a successor thereof. Each of the components of the information processing system 10 will be described below.

A CPU (Central Processing Unit) 11, which is the main controller of the system 10, executes various application programs under the control of an operating system (OS). Preferably, the OS can support bit-mapped drawing functionality and GUI (Graphical User Interface), for example, UNIX, or Windows 98/NT from Microsoft Corporation.

As shown in FIG. 1, the CPU 11 is connected with other components (to be described later) via a bus 18. Each of the components on the bus 18 is assigned a unique memory address or I/O address, so that the CPU 11 can access any of the components on the bus 18 by specifying the corresponding address. The bus 18 may be, for example, a PCI (Peripheral Component Interface) bus.

A memory 12 is a storage device for storing program codes to be executed by the CPU 11 and temporarily storing working data during the execution. It is to be understood that the memory 12 shown in FIG. 1 includes both non-volatile memory (ROM) and volatile memory (RAM).

A display controller 13 is a controller dedicated for executing drawing commands issued by the CPU 11, and supports, for example, a bit-mapped drawing function of SVGA (Super Video Graphics Array) or XGA (eXtended Graphics Array). Drawing data processed by the display controller 13 is temporarily written in, for example, a frame buffer (not shown), and then is output to a display apparatus 21. The display apparatus 21 may be, for example, a CRT (Cathode Ray Tube) display or an LCD (Liquid Crystal Display).

An input device interface 14 is a device for connecting user input devices such as a keyboard 22 and a mouse 23 to the system 10. The input device interface 14 generates interrupts to the CPU 11 in response to inputs via the keyboard 22 or indications of coordinate points via the mouse 23.

A network interface 15 facilitates connection of the system 10 to a network (not shown) such as a LAN (Local Area Network) in accordance with a predetermined communications protocol, for example, Ethernet. The network interface 15 is typically implemented in the form of a LAN adapter card inserted into a PCI bus slot on a motherboard (not shown).

A plurality of hosts (computers) is transparently connected to the LAN, providing a distributed computing environment. Some of the hosts function as routers, making connections to external networks such as other LANs and the Internet. On the Internet, information retrieval spaces such as WWW (World Wide Web) are constructed and various servers 30 such as WWW servers provide information resources. On TCP/IP networks such as the Internet, locations of the information resources are represented in the form of URL (Uniform Resource Locator). The server 30 may be implemented by the same hardware configuration as the information processing system 10.

The information processing system 10 may be connected to an external network via a modem and the PSTN (Public Switched Telephone Network) (neither shown), instead of the network interface 15.

An external device interface 16 is a device for connecting external devices such as a hard disc drive (HDD) 24 to the system 10. The external device interface 16 conforms to an interface standard, for example, IDE (Integrated Drive Electronics) or SCSI (Small Computer System Interface).

The HDD 24 is an external storage device in which a magnetic disc as a storage medium is fixedly mounted, as is known, and has superior storage capacity, data transfer rate, etc. compared to other types of storage devices. Software programs are stored onto the HDD 24 in an executable form, i.e., the programs are installed on the system. Typically, the HDD 24 stores, in a non-volatile form, program codes of an operating system, application programs, device drivers, etc. to be executed by the CPU 11.

A media drive 25 is connected to the system 10 via a media drive interface 17. The media drive 25 is a device for accessing and reading data from the data recording surface of a removable medium loaded thereon, such as an FD (Floppy Disc), a CD-ROM (Compact Disc Read-Only Memory), an MO (Magneto-Optical Disc), a DVD (Digital Versatile Disc), and a memory stick.

The removable medium is used primarily for backing up software programs and data files as computer-readable data (files) and transferring (selling, distributing, providing, etc.) the computer-readable data between a plurality of systems.

Figure 2:
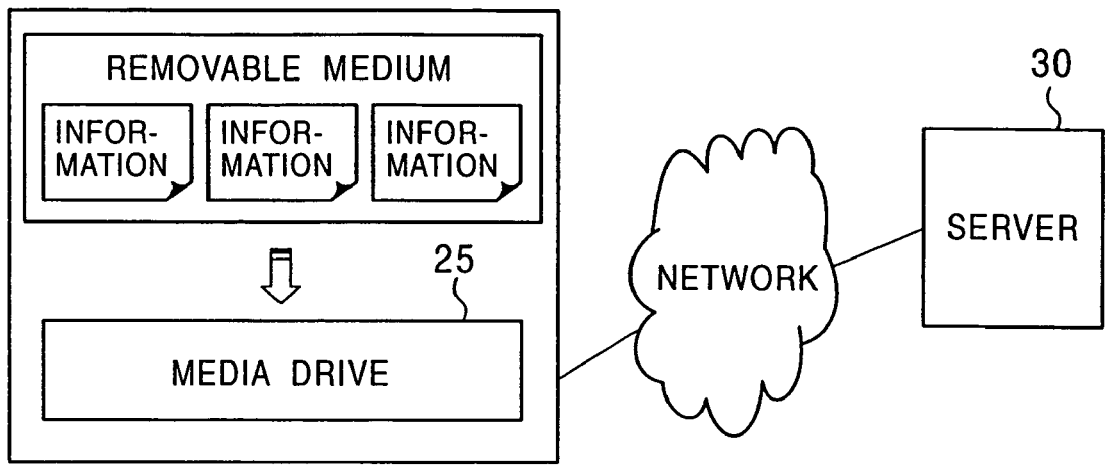
FIG. 2 is a schematic diagram showing a data distribution system according to the embodiment.

FIG. 2 schematically shows a data distribution system according to the embodiment.

Information may be recorded on a removable medium, for example, a floppy disc, which is a cartridge physically independent of, i.e., detachable from, the media drive 25. The media drive 25, for example, a floppy disc drive, accesses an information recording surface of the removable medium loaded thereon and reads information recorded on the information recording surface.

In implementing the present invention, the media drive 25 preferably has the function of detecting the presence of a removable medium loaded thereon. The information processing system 10 including the media drive 25 is connected via a network to one or more external systems such as the server 30.

The server 30 is, for example, a computer system which functions as an HTTP server, allowing information including still picture, etc. to be distributed to or browsed by an HTTP browser running on another host connected to the server 30 via the network.

Figure 3:
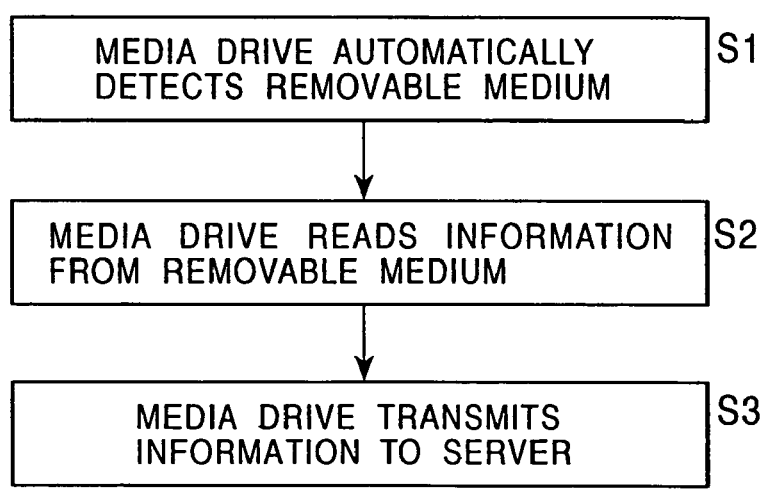
FIG. 3 is a flowchart showing the processing steps for data distribution according to the embodiment.

FIG. 3 is a flowchart showing the processing steps for distributing data according to the embodiment. The processing steps for data distribution will be described below.

In step S1, the media drive 25 automatically detects whether or not a removable medium is loaded thereon, and then in step S2, it reads information stored on the removable medium.

In step S3, the information which has been read is transmitted via a network to a device outside the system 10, such as the server 30.

The destination of the information may be determined on the basis of a destination address stored on the removable medium, or on the basis of a predetermined destination address for the media drive 25.

Figure 4:
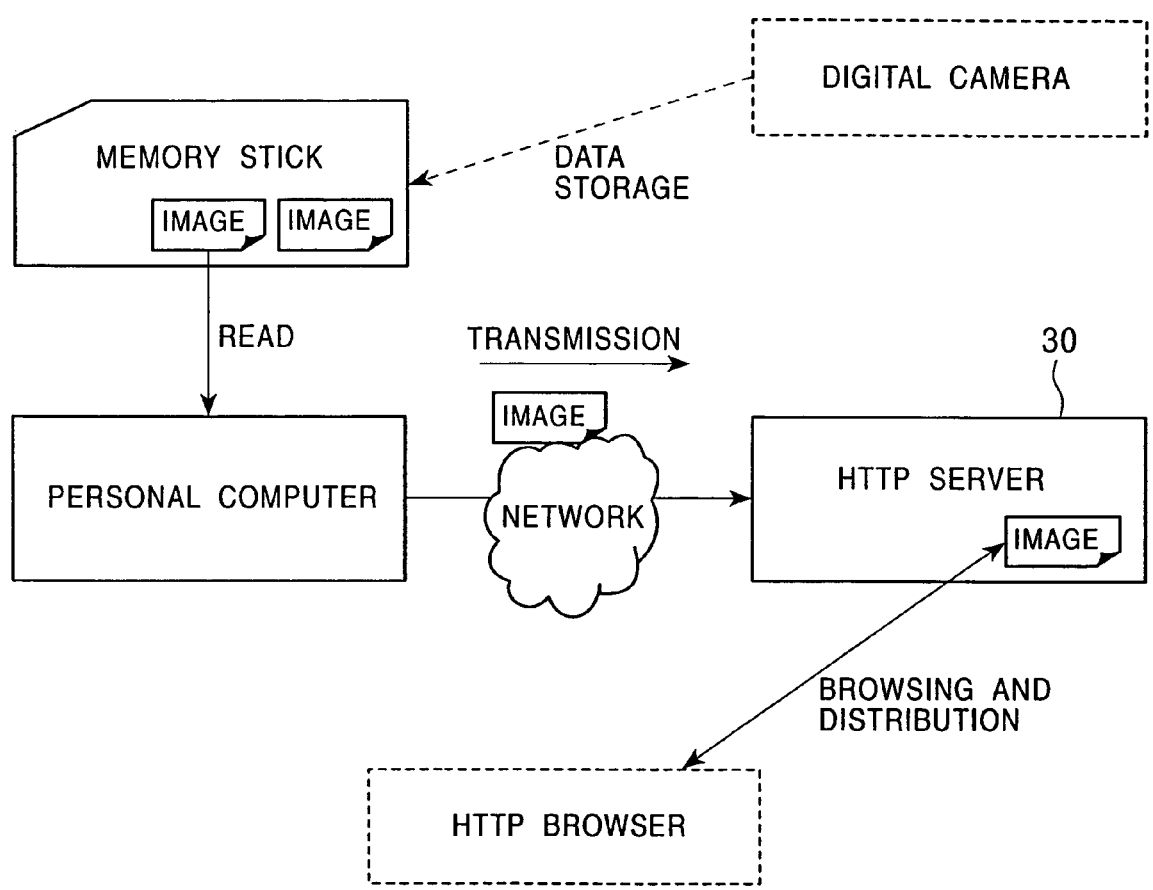
FIG. 4 is a schematic diagram showing the procedure for distributing video data captured by a digital camera and stored on a memory stick.

FIG. 4 shows an example of a data distribution procedure according to the embodiment, in which video data captured by a digital camera and stored in a memory stick is distributed.

The video data captured by the digital camera is stored in the memory stick in a predetermined file format.

The memory stick is inserted into a memory slot of a personal computer. The personal computer detects the insertion of the memory stick, and accesses the memory stick in order to automatically read the video data files.

Alternatively, an external device, such as the digital camera, which supplies information may be connected to an IEEE 1394 port or a USB port of the computer and used instead of a memory stick or a similar medium. In that case, similarly, the video data will be read automatically from the external device when the personal computer detects that the external device has been connected to the port.

Then, the personal computer transmits the video data which has been read via a local network such as a LAN or via a wider network such as the Internet to the server 30, where the video data is stored. The server 30 is, for example, an HTTP server which transfers the video data in accordance with the HTTP protocol.

The destination of the video data may be determined on the basis of a destination address stored in the memory stick, or on the basis of a destination address predetermined for the memory stick.

The location of the video data stored on the HTTP server 30 is described using a resource identifier such as URL. An HTTP browser running on another host connected to the HTTP server 30 via a network is allowed to browse the video data on the server 30 using the URL or equivalent link information.

Figure 5:
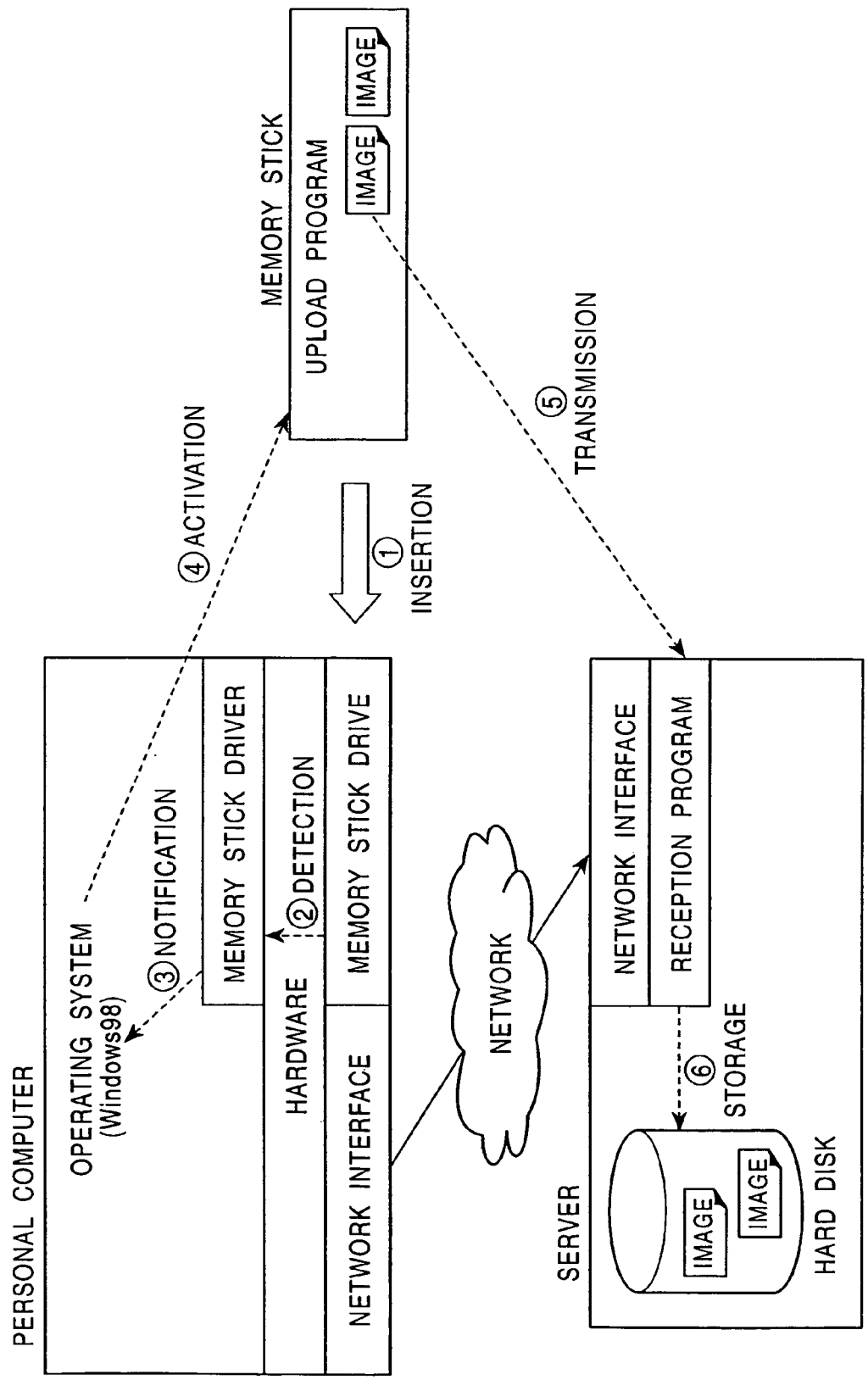
FIG. 5 is a schematic diagram showing the internal operation of a personal computer and a server when the video data captured by the digital camera and stored on the memory stick is automatically transmitted from the memory stick loaded on the personal computer to the server which receives, stores, and makes the video data publicly available.

FIG. 5 illustrates the internal operations of the personal computer and the server, when the video data captured by the digital camera and stored on the memory stick loaded on the personal computer is automatically transmitted to the server.

Upon automatically detecting the insertion of the memory stick, the personal computer reads the video data from the memory stick, and transmits the video data to the HTTP server via the network. The video data is stored on the HTTP server, whereby the video information is allowed to be browsed via the network using the HTTP browser.

More specifically, the video data is transmitted by the following procedure:

1. The memory stick is inserted into the memory slot of the personal computer.

2. A memory stick driver detects the insertion of the memory stick via the memory stick drive.

3. The memory stick driver notifies the operating system of the insertion of the memory stick.

If the removable medium is a PCMCIA (Personal Computer Memory Card International) card instead of the memory stick, the event of card insertion is notified to an upper system such as the OS via a socket service or a card service, as is known.

4. The operating system activates an upload program stored in the memory stick.

If the operating system is "Windows 98" from Microsoft Corporation, automatic activation of the upload program is disabled in the default setting. Thus, the automatic activation must be manually enabled.

5. The upload program transmits the video data stored in the memory stick to the server via the network interface and the network.

6. A reception program running on the server receives the video data and stores the video data on a hard disc of the server.

[Supplement]

Although the present invention has been described hereinabove in relation to a specific embodiment, it is apparent to those skilled in the art that various modifications and alternatives of the embodiment can be made without departing from the gist of the present invention.

In implementing the present invention, a floppy disc, a CD, an MO, a DVD, a PCMCIA card, etc. may be used as the removable medium. Furthermore, the type of data stored on the server may vary; for example, motion pictures, music, text, program codes, etc. may be stored.

Furthermore, as an alternative to the removable medium, a device compatible with a bus system such as IEEE 1394 and USB, which supports plug and play (PnP) functionality, may be used. For example, by using a digital video camera having an IEEE 1394 terminal in combination with a personal computer, motion picture captured by the digital video camera can be automatically and readily stored on the server, thereby allowing the motion picture to be distributed or made publicly available.

Furthermore, by incorporating a database in the server which receives and stores data, permanent storage and efficient centralized control of uploaded data such as still picture can be achieved.

Furthermore, by using a display apparatus, still pictures or motion pictures can be readily viewed.

Furthermore, by uploading data to a content server for mobile devices based on, for example, Wireless Application Protocol, viewed of motion picture, etc. is readily allowed on small mobile information terminals such as cellular phones and PDAs (Personal Digital Assistants).

The description hereinabove should be construed as illustrative only, not as restrictive. The scope of the present invention is defined solely by the appended Claims.

What is claimed is:

1. An information processing system for distributing content supplied from a content medium of an external device having a connecter, said information processing system comprising:

a detector for detecting insertion of said connecter;

a reader for accessing said external device and automatically reading said content medium in response to detecting the insertion of said connecter; and a transmitter for transmitting via a network said content read from said external device to a host system, wherein the reader stores an address of the host system and the transmitter transmits the content directly to the host system based on the address without storing the content on an intermediate server or hard disk.

2. An information processing system according to claim 1, wherein said external device is a digital still camera.

3. An information processing system according to claim 1, wherein said external device is a movie camera.

* * * * *

UNITED STATES PATENT AND TRADEMARK OFFICE
CERTIFICATE OF CORRECTION

PATENT NO. : 7,603,405 B2  Page 1 of 1
APPLICATION NO. : 11/437053
DATED : October 13, 2009
INVENTOR(S) : Tadashi Ehara It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 539 days.

Signed and Sealed this

Fourteenth Day of December, 2010

David J. Kappos
*Director of the United States Patent and Trademark Office*